United States Patent
Zhang et al.

(10) Patent No.: US 12,167,275 B2
(45) Date of Patent: Dec. 10, 2024

(54) TSN AND 5GS QoS MAPPING—A USER PLANE BASED METHOD

(71) Applicant: Telefonaktiebolaget LM Ericsson (publ), Stockholm (SE)

(72) Inventors: Kefeng Zhang, Beijing (CN); Kun Wang, Solna (SE); Marilet De Andrade Jardim, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 243 days.

(21) Appl. No.: 17/616,139

(22) PCT Filed: May 12, 2020

(86) PCT No.: PCT/IB2020/054483
§ 371 (c)(1),
(2) Date: Dec. 2, 2021

(87) PCT Pub. No.: WO2020/245679
PCT Pub. Date: Dec. 10, 2020

(65) Prior Publication Data
US 2022/0256393 A1 Aug. 11, 2022

(30) Foreign Application Priority Data
Jun. 3, 2019 (WO) ................ PCT/CN2019/089766

(51) Int. Cl.
*H04W 28/02* (2009.01)
*H04W 28/24* (2009.01)

(52) U.S. Cl.
CPC ... *H04W 28/0268* (2013.01); *H04W 28/0263* (2013.01); *H04W 28/24* (2013.01)

(58) Field of Classification Search
CPC ......... H04W 28/0268; H04W 28/0908; H04W 28/268; H04W 28/0247; H04W 72/087; H04L 47/2416; H04L 47/28; H04L 47/20
See application file for complete search history.

(56) References Cited

U.S. PATENT DOCUMENTS

| | | | |
|---|---|---|---|
| 9,332,579 B2 | 5/2016 | Scherer et al. | |
| 11,088,962 B2 | 8/2021 | Chen et al. | |
| (Continued) | | | |

FOREIGN PATENT DOCUMENTS

| | | |
|---|---|---|
| CN | 108366023 A | 8/2018 |
| CN | 108809852 A | 11/2018 |
| (Continued) | | |

OTHER PUBLICATIONS

Non-Final Office Action for U.S. Appl. No. 17/294,997, mailed Mar. 30, 2023, 25 pages.
(Continued)

*Primary Examiner* — Iqbal Zaidi
(74) *Attorney, Agent, or Firm* — Withrow & Terranova, PLLC

(57) ABSTRACT

Systems and methods are disclosed herein that relate to Quality of Service (QoS) mapping in a cellular communications system that operates as a Time Sensitive Networking (TSN) bridge. In one embodiment, a method of operation of a Session Management Function (SMF) in a cellular communications system that operates as a bridge for a TSN system comprises obtaining a QoS mapping table that maps TSN traffic classes to QoS flows within the cellular communications system and distributing at least a part of the QoS mapping table to a User Plane Function (UPF) or a TSN Translator (TT) at the UPF side. In this manner, QoS mapping is provided. Corresponding embodiments of an SMF and a network node that implements an SMF are also disclosed. Embodiments of method of operation of an Appli- (Continued)

cation Function (AF) and corresponding embodiments of an AF and a network node that implements an AF are also disclosed.

10 Claims, 10 Drawing Sheets

(56) References Cited

U.S. PATENT DOCUMENTS

| | | | |
|---|---|---|---|
| 2015/0373660 | A1 | 12/2015 | Gunnarsson et al. |
| 2018/0184428 | A1 | 6/2018 | Cariou et al. |
| 2018/0220356 | A1 | 8/2018 | Tenny et al. |
| 2019/0297025 | A1 | 9/2019 | Kobayashi et al. |
| 2019/0322299 | A1 | 10/2019 | Mong et al. |
| 2019/0363843 | A1 | 11/2019 | Gordaychik |
| 2020/0053678 | A1 | 2/2020 | Moon et al. |
| 2020/0059829 | A1 | 2/2020 | Joseph et al. |
| 2020/0137615 | A1 | 4/2020 | Joseph et al. |
| 2020/0389405 | A1 | 12/2020 | Mardmoeller et al. |
| 2021/0007160 | A1 | 1/2021 | Sivasiva Ganesan et al. |
| 2021/0204172 | A1 | 7/2021 | Rost et al. |
| 2021/0243641 | A1* | 8/2021 | Gangakhedkar ...... H04M 15/66 |
| 2021/0306901 | A1 | 9/2021 | Mannweiler et al. |
| 2022/0022088 | A1 | 1/2022 | Gebert et al. |
| 2022/0224651 | A1* | 7/2022 | Rost ........................ H04L 47/28 |
| 2022/0417785 | A1* | 12/2022 | Diachina ........... H04W 28/0247 |

FOREIGN PATENT DOCUMENTS

| | | |
|---|---|---|
| CN | 111865830 | 10/2020 |
| WO | 2017082779 A1 | 5/2017 |
| WO | 2018166576 A1 | 9/2018 |
| WO | 2020104946 A1 | 5/2020 |
| WO | 2020148616 A1 | 7/2020 |
| WO | 2020165857 A1 | 8/2020 |

OTHER PUBLICATIONS

Author Unknown, "3rd Generation Partnership Project; Technical Specification Group Services and System Aspects; Study on Communication for Automation in Vertical Domains (Release 16)," 3GPP TR 22.804 V16.1.0, Sep. 2018, 3GPP Organizational Partners, 189 pages.
Author Unknown, "Technical Specification Group Services and System Aspects; Study on Communication for Automation in Vertical Domains (Release 16)," Technical Report 22.804, Version 16.2.0, 3GPP Organizational Partners, Dec. 2018, 196 pages.
Author Unknown, "Technical Specification Group Services and System Aspects; Study on Cellular Internet of Things (IoT) support and evolution for the 5G System (Release 16)," Technical Report 23.724, Version 16.0.0, 3GPP Organizational Partners, Dec. 2018, 276 pages.
Author Unknown, "3rd Generation Partnership Project; Technical Specification Group Services and System Aspects; Study on 5GS Enhanced support of Vertical and LAN Services (Release 16)," 3GPP TR 23.734 V0.2.0, Sep. 2018, 3GPP Organizational Partners, 39 pages.
Author Unknown, "Technical Specification Group Services and System Aspects; Study on enhancement of 5GS for Vertical and LAN Services (Release 16)," Technical Report 23.734, Version 16.0.0, 3GPP Organizational Partners, Dec. 2018, 107 pages.
Author Unknown, "Technical Specification Group Services and System Aspects; Study on enhanement of 5GS for Vertical and LAN Services (Release 16)," Technical Report 23.734, Version 16.1.0, 3GPP Organizational Partners, Mar. 2019, 111 pages.
Author Unknown, "Technical Specification Group Services and System Aspects; Study on enhancement of 5G System (5GS) for vertical and Local Area Network (LAN) services (Release 16)," Technical Report 23.734, Version 16.2.0, Jun. 2019, 3GPP Organizational Partners, 117 pages.
Author Unknown, "3rd Generation Partnership Project; Technical Specification Group Radio Access Network; Study on NR Industrial Internet of Things (IOT); Release 16," 3GPP TR 38.825 V0.0.0, Sep. 2018, 3GPP Organizational Partners, 10 pages.
Author Unknown, "Technical Specification Group Services and System Aspects; Service requirements for cyber-physical control applications in vertical domains; Stage 1 (Release 16)," Technical Specification 22.104, Version 1.0.0, 3GPP Organizational Partners, Dec. 2018, 55 pages.
Author Unknown, "Technical Specification Group Services and System Aspects; System Architecture for the 5G System; Stage 2 (Release 15)," Technical Specification 23.501, Version 15.3.0, 3GPP Organizational Partners, Sep. 2018, 226 pages.
Author Unknown, "Technical Specification Group Services and System Aspects; System Architecture for the 5G System (5GS); Stage 2 (Release 15)," Technical Specification 23.501, Version 15.8.0, 3GPP Organizational Partners, Dec. 2019, 248 pages.
Author Unknown, "Technical Specification Group Services and System Aspects; System Architecture for the 5G System; Stage 2 (Release 16)," Technical Specification 23.501, Version 16.0.2, Apr. 2019, 3GPP Organizational Partners, 317 pages.
Author Unknown, "Technical Specification Group Services and System Aspects; Procedures for the 5G System; Stage 2 (Release 15)," Technical Specification 23.502, Version 15.4.0, 3GPP Organizational Partners, Dec. 2018, 346 pages.
Author Unknown, "Technical Specification Group Services and System Aspects; Procedures for the 5G System; Stage 2 (Release 16)," Technical Specification 23.502, Version 16.0.2, Apr. 2019, 3GPP Organizational Partners, 419 pages.
Author Unknown, "Technical Specification Group Services and System Aspects; Policy and Charging Control Framework for the 5G System; Stage 2 (Release 15)," Technical Specification 23.503, Version 15.3.0, 3GPP Organizational Partners, Sep. 2018, 70 pages.
Author Unknown, "Technical Specification Group Services and System Aspects; Policy and Charging Control Framework for the 5G System; Stage 2 (Release 15)," Technical Specification 23.503, Version 15.4.0, 3GPP Organizational Partners, Dec. 2018, 76 pages.
Author Unknown, "Technical Specification Group Radio Access Network; NG-RAN; NG Application Protocol (NGAP) (Release 15)," Technical Specification 38.413, Version 15.5.0, 3GPP Organizational Partners, Sep. 2019, 329 pages.
Author Unknown, "IEEE Standard for Local and metropolitan area networks—Bridges and Bridged Networks, Amendment 25: Enhancements for Scheduled Traffic," IEEE Computer Society, IEEE Std 802.1Qbv, 2015, 57 pages.
Catt, "R2-1816363: 5GS and TSN Integration," 3GPP TSG-RAN WG2 Meeting #104, Nov. 12-16, 2018, Spokane, USA, 5 pages.
Ericsson, "C3-182341: Changes to C3-182188: Qos Parameter mapping in PCF," Third Generation Partnership Project (3GPP), TSG-CT WG3 Meeting #96, Apr. 16-20, 2018, Kunming, China, 8 pages.
Ericsson, "S2-19xxxx: Support for IEEE 802.1Qbv scheduling," 3GPP TSG-SA WG2 Meeting #131, Feb. 25-Mar. 1, 2019, Santa Cruz, Spain, 7 pages.
Ericsson, "S2-19xxxx: TSN-5GS QoS parameters mapping," 3GPP TSG-SA WG2 Meeting #131, Feb. 25-Mar. 1, 2019, Santa Cruz, Spain, 13 pages.
Ericsson, "S2-1900610: Additional TSN traffic patter for RAN optimization," Third Generation Partnership Project (3GPP), TSG-SA WG2 Meeting #130, Jan. 21-25, 2019, Kochi, India, 6 pages.
Ericsson, "S2-1901150: TSN QoS and traffic scheduling in 5GS," Third Generation Partnership Project (3GPP), TSG-SA WG2 Meeting #130, Jan. 21-25, 2019, Kochi, India, 9 pages.
Ericsson, "S2-1901721: Mapping of bridge port and QoS control in 5GS," 3GPP TSG-SA WG2 Meeting #131, Change Request, Feb. 25-Mar. 1, 2019, Santa Cruz, Spain, 7 pages.
Ericsson, "S2-1903375: TSN-5GS QoS mapping partly at AF and PCF," Third Generation Partnership Project (3GPP), TSG-SA WG2 Meeting #132, Apr. 8-12, 2019, Xi'an, China, 7 pages.
Huawei et al., "S2-1811211: QoS Negotiation between 3GPP and TSN networks KI#3.1," SA WG2 Meeting #129, Oct. 15-19, 2018, Dongguan, China, 10 pages.

(56) References Cited

OTHER PUBLICATIONS

Kagermann, Prof. Dr. Henning, et al., "Recommendations for implementing the strategic initiative Industrie 4.0," Final report of the Industrie 4.0 working group, acatech—National Academy of Science and Engineering, Munich, Apr. 2013, 84 pages.
Kentis, Angelos Mimidis, et al., "Effects of Port Congestion in the Gate Control List Scheduling of Time Sensitive Networks," 8th International Conference on the Network of the Future (NoF), IEEE, 2017, pp. 138-140.
Neumann, Arne, et al., "Towards Integration of Industrial Ethernet with 5G Mobile Networks," International Workshop on Factory Communication Systems, Jun. 2018, IEEE, 4 pages.
Nokia, et al., "R2-1814992: TSN performance requirements evaluation," Third Generation Partnership Project (3GPP), TSG-RAN WG2 Meeting #103bis, Oct. 8-12, 2018, Chengdu, China, 9 pages.
Nokia, et al., "R2-1817270: NR support for TSN traffic patterns," Third Generation Partnership Project (3GPP), TSG- RAN WG2 Meeting #104, Nov. 12-16, 2018, Spokane, USA, 9 pages.
Nokia et al., "S2-1810436: TSN-QoS Framework," SA WG2 Meeting #129, Oct. 15-19, 2018, Dongguan, China, 9 pages.
Nokia, et al., "S2-1903656: Update to Support PDU Session Binding," SA WG2 Meeting #132, Apr. 8-12, 2019, Xian, China, 4 pages.
Qualcomm Incorporated, et al., "S2-1906754: Addressing Editor's notes on TSN," 3GPP TSG-SA2 Meeting #133, May 13-17, 2019, Reno, Nevada, 13 pages.
Siemens AG, et al., "S1-183120: cyberCAV—5G in Industrial Automation: Different and Multiple Time Domains for Synchronization," 3GPP TSG-SA WG1 Meeting #84, Nov. 12-16, 2018, Spokane, Washington, 8 pages.
International Search Report and Written Opinion for International Patent Application No. PCT/IB2019/059942, mailed Feb. 4, 2020, 17 pages.
Written Opinion for International Patent Application No. PCT/IB2019/059942, mailed Oct. 7, 2020, 11 pages.
International Preliminary Report on Patentability for International Patent Application No. PCT/IB2019/059942, mailed Feb. 9, 2021, 24 pages.
Invitation to Pay Additional Fees and Partial Search for International Patent Application No. PCT/IB2020/050181, mailed Apr. 1, 2020, 14 pages.
International Search Report and Written Opinion for International Patent Application No. PCT/IB2020/050181, mailed May 18, 2020, 28 pages.
Invitation to Pay Additional Fees and Partial Search for International Patent Application No. PCT/IB2020/051264, mailed May 8, 2020, 7 pages.
International Search Report and Written Opinion for International Patent Application No. PCT/IB2020/051264, mailed Jun. 30, 2020, 16 pages.
Invitation to Pay Additional Fees and Partial Search for International Patent Application No. PCT/IB2020/054483, mailed Aug. 17, 2020, 15 pages.
International Search Report and Written Opinion for International Patent Application No. PCT/IB2020/054483, mailed Oct. 8, 2020, 21 pages.
Finn, "Introduction to Time-Sensitive Networking," IEEE Communications Standards Magazine, vol. 2, Issue 2, Jun. 2018, pp. 22-28.
Examination Report for Indian Patent Application No. 202147040911, mailed Apr. 28, 2022, 6 pages.
Non-Final Office Action for U.S. Appl. No. 17/294,997, mailed Apr. 14, 2022, 22 pages.
Ericsson, "C3-182188: QoS parameter mapping in PCF," 3GPP TSG-CT WG3 Meeting #96, Apr. 16-20, 2018, Kunming, China, 8 pages.
LG Electronics, "S2-1810280: Discussion on QoS in MA-PDU," 3GPP TSG-SA WG2 Meeting #129, Oct. 15-19, 2018, Dongguan, China, 9 pages.
Nokia et al., "S2-1811209: TSN- QoS Framework," 3GPP SA WG2 Meeting #129, Oct. 15-19, 2018, Dongguan, China, 12 pages.

Examination Report for European Patent Application No. 20702358.1, mailed Dec. 13, 2022, 9 pages.
Notice of Reasons for Rejection for Japanese Patent Application No. 2021-571531, mailed Jan. 24, 2023, 8 pages.
Advisory Action for U.S. Appl. No. 17/431,202, mailed Dec. 23, 2022, 4 pages.
Non-Final Office Action for U.S. Appl. No. 17/863,645, mailed Jan. 10, 2023, 21 pages.
Second Office Action for Chinese Patent Application No. 202080014340.3, mailed Jun. 28, 2022, 7 pages.
Examination Report for European Patent Application No. 20708642.2, mailed Jun. 9, 2022, 7 pages.
Final Office Action for U.S. Appl. No. 17/294,997, mailed Oct. 14, 2022, 27 pages.
Final Office Action for U.S. Appl. No. 17/431,202, mailed Sep. 23, 2022, 16 pages.
Craciunas, "Scheduling Real-Time Communications in IEEE 802.1Qbv Time Sensitive Networks," 24th International Conference on Real-Time Networks and Systems, Oct. 2016, pp. 183-192.
Non-Final Office Action for U.S. Appl. No. 17/422,496, mailed Jun. 29, 2023, 11 pages.
Notice of Allowance for U.S. Appl. No. 17/863,645, mailed Jul. 20, 2023, 8 pages.
Final Office Action for U.S. Appl. No. 17/294,997, mailed Jul. 7, 2023, 28 pages.
Examination Report for European Patent Application No. 19809637.2, mailed Jun. 23, 2023, 8 pages.
Non-Final Office Action for U.S. Appl. No. 18/106,761, mailed Jul. 19, 2023, 19 pages.
Advisory Action for U.S. Appl. No. 17/294,997, mailed Sep. 20, 2023, 4 pages.
Author Unknown, "Draft Standard for Local and metropolitan area networks-Bridges and Bridged Networks; Amendment: Stream Reservation Protocol (SRP) Enhancements and Performance Improvements," IEEE P802.1Qcc/D2.3, May 3, 2018, 214 pages.
Huawei, et al., "S2-1900590: Discussion on system enhancement for TSN logical bridge management," 3GPP TSG-SA WG2 Meeting #130, Jan. 21-25, 2019, Kochi, India, 4 pages.
Office Action for Chinese Patent Application No. 202080014340.3, mailed Jan. 21, 2022, 6 pages.
Non-Final Office Action for U.S. Appl. No. 17/431,202, mailed Feb. 9, 2022, 19 pages.
Non-Final Office Action for U.S. Appl. No. 17/294,997, mailed Dec. 7, 2023, 34 pages.
Final Office Action for U.S. Appl. No. 17/422,496, mailed Dec. 1, 2023, 10 pages.
Notice of Non-Compliant Amendment for U.S. Appl. No. 18/106,761, mailed Oct. 30, 2023, 4 pages.
Notice of Allowance for U.S. Appl. No. 18/106,761, mailed Jan. 24, 2024, 8 pages.
Ericsson, "S2-1901718: TSN-5GS QoS mapping," 3GPP TSG-SA WG2 Meeting #131, Feb. 25-Mar. 1, 2019, Santa Cruz, Spain, 6 pages.
Ericsson, "S2-1903378: Support for IEEE 802.1Qbv scheduling," 3GPP TSG-SA WG2 Meeting #132, Apr. 8-12, 2019, Xi'an, China, 6 pages.
Huawei, et al., "S2-1811021: QoS Negotiation between 3GPP and TSN networks KI#3.1," 3GPP SA WG2 Meeting #129, Oct. 15-19, 2018, Dongguan, China, 9 pages.
Huawei, et al., "S2-1812232: Updates on Solution #18," 3GPP TSG-SA WG2 Meeting #129Bis, Nov. 26-30, 2018, West Palm Beach, Florida, 8 pages.
Qualcomm Incorporated, et al., "S2-1904620: Addressing Editor's notes on TSN," 3GPP TSG-SA2 Meeting #132, Apr. 8-12, 2019, Xi'an, China, 11 pages.
Intention to Grant for European Patent Application No. 20726558.8, mailed May 10, 2024, 50 pages.
Notice of Allowance for U.S. Appl. No. 17/294,997, mailed Aug. 20, 2024, 7 pages.

\* cited by examiner

TSN AND 5GS QoS MAPPING—A USER PLANE BASED METHOD

RELATED APPLICATIONS

This application is a 35 U.S.C. § 371 national phase filing of International Application No. PCT/IB2020/054483, filed May 12, 2020, which claims the benefit of PCT patent application serial number PCT/CN2019/089766, filed Jun. 3, 2019, the disclosures of which are hereby incorporated herein by reference in their entireties.

TECHNICAL FIELD

The present disclosure relates to a cellular communications system and, in particular, to a cellular communications system that operates as a bridge in a Time Sensitive Network (TSN).

BACKGROUND

The manufacturing industry is undergoing a digital transformation towards the "Fourth Industrial Revolution" (Industry 4.0) towards smart manufacturing. Flexible connectivity infrastructure is a key enabler for manufacturing to interconnect machines, products, and all kinds of other devices in a flexible, secure, and consistent manner.

The Third Generation Partnership Project (3GPP) Fifth Generation (5G) system, as an alternative to or complementing the wired connectivity solution, should support new requirements and challenges coming from these vertical domains. 3GPP has a study on Communication for Automation in Vertical Domains (Technical Report (TR) 22.804) in which many use cases from vertical domains are analyzed. Industrial automation applications, such as motion control, have extremely stringent service requirements regarding high availability, ultra-reliable, low latency, low jitter, and determinism, such as e.g., 1-10 millisecond (ms) end-to-end latency and 1-100 microsecond (µs) packet delay variation.

SUMMARY

Systems and methods are disclosed herein that relate to Quality of Service (QoS) mapping in a cellular communications system that operates as a bridge for a Time Sensitive Networking (TSN) system. In one embodiment, a method of operation of a Session Management Function (SMF) in a cellular communications system that operates as a bridge for a TSN system comprises obtaining a QoS mapping table that maps TSN traffic classes to QoS flows within the cellular communications system and distributing at least a part of the QoS mapping table to a User Plane Function (UPF) or a TSN Translator (TT) at the UPF side. In this manner, QoS mapping between TSN traffic classes of the TSN system and QoS flows of the cellular communications system is provided.

In one embodiment, the at least a part of the QoS mapping table comprises available TSN traffic classes that are associated with a bridge identifier (ID) and a port ID.

In one embodiment, different QoS mapping tables are used for different UPFs.

In one embodiment, the QoS mapping table is pre-configured. In one embodiment, the QoS mapping table is pre-configured during a capability reporting phase in which the cellular communications system reports its capabilities related to operation as a bridge for the TSN system.

In one embodiment, the QoS flows comprise one or more pre-established QoS flows. In one embodiment, the QoS flows comprise one or more QoS flows that are pre-established during a capability reporting phase in which the cellular communications system reports its capabilities related to operation as a bridge for the TSN system. In one embodiment, the QoS flows comprise one or more QoS flows that are pre-established at a time of establishment of one or more Protocol Data Unit (PDU) sessions to the TSN system based on one or more pre-configured QoS profiles.

Corresponding embodiments of an SMF are also disclosed. In one embodiment, a SMF for a cellular communications system that operates as a bridge for a TSN system is adapted to obtain a QoS mapping table that maps TSN traffic classes to QoS flows within the cellular communications system and distribute at least a part of the QoS mapping table to a UPF or a TT at the UPF side.

Corresponding embodiments of a network node that implements an SMF are also disclosed. In one embodiment, a network node that implements an SMF for a cellular communications system that operates as a bridge for a TSN system comprises a network interface and processing circuitry associated with the network interface, wherein the processing circuitry is configured to cause the network node to obtain a QoS mapping table that maps TSN traffic classes to QoS flows within the cellular communications system and distribute at least a part of the QoS mapping table to a UPF or a TT at the UPF side.

Embodiments of a method of operation of an Application Function (AF) are also disclosed. In one embodiment, a method of operation of an AF in a cellular communications system that operates as a bridge for a TSN system comprises, during a configuration phase of the bridge, receiving one or more TSN QoS requirements and one or more TSN scheduling parameters from a controller associated with the TSN system and informing one or more network nodes in the cellular communications system of which QoS flows from among a plurality of pre-configured QoS flows are in use by the TSN system.

In one embodiment, the method further comprises, during the configuration phase of the bridge, distributing one or more TSN parameters to relevant network nodes in the cellular communications system. In one embodiment, the one or more TSN parameters comprise a Qbv schedule and time sensitive communication assistance information.

In one embodiment, the method further comprises providing a response to the controller associated with the TSN system.

Corresponding embodiments of an AF are also disclosed. In one embodiment, an AF for a cellular communications system that operates as a bridge for a TSN system is adapted to, during a configuration phase of the bridge, receive one or more TSN QoS requirements and one or more TSN scheduling parameters from a controller associated with the TSN system and inform one or more network nodes in the cellular communications system of which QoS flows from among a plurality of pre-configured QoS flows are in use by the TSN system.

Corresponding embodiments of a network node that implements an AF are also disclosed. In one embodiment, a network node that implements an AF for a cellular communications system that operates as a bridge for a TSN system comprises a network interface and processing circuitry associated with the network interface, wherein the processing circuitry is configured to cause the network node to, during a configuration phase of the bridge, receive one or more TSN QoS requirements and one or more TSN scheduling parameters from a controller associated with the TSN system and inform one or more network nodes in the cellular communications system of which QoS flows from among a plurality of pre-configured QoS flows are in use by the TSN system.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
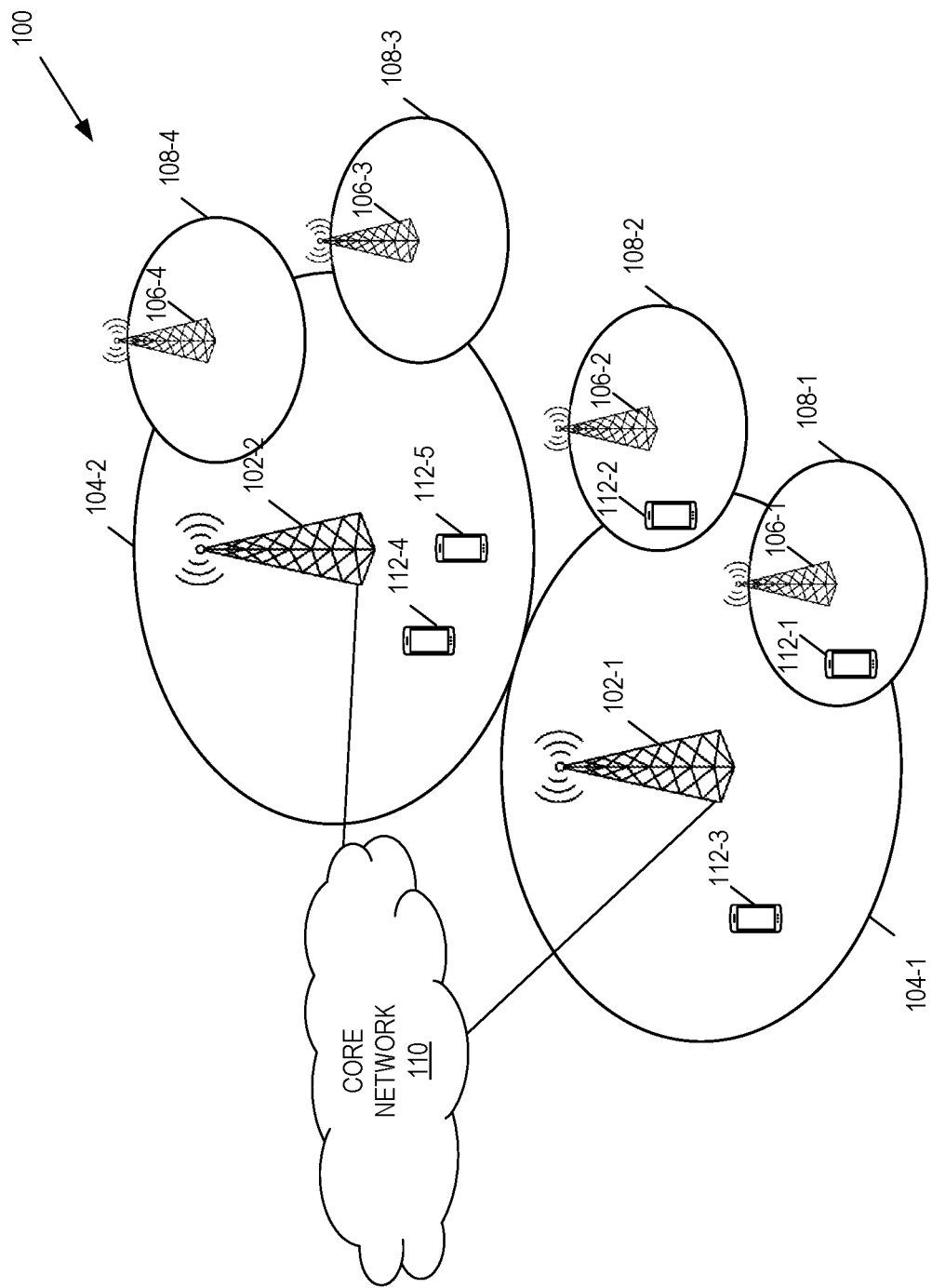
FIG. 1 illustrates one example of a cellular communications system according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

For Time Sensitive Network (TSN)-5G integration, 3GPP Technical Report (TR) 23.734 has agreed on a model in which the 5G system is modeled as a virtual bridge (or several bridges). 3GPP TR 23.734 Solution #18 describes Quality of Service (QoS) negotiation between the 3GPP and TSN networks. The control plane based QoS negotiation includes two stages:
  1. Stage 1: Bridge capability report phase. TSN capabilities reporting (also called bridge onboarding phase) for 5G System (5GS) TSN bridge ([1] section 6.18.1.2.1).
  2. Stage 2: Bridge configuration phase. Solution #30 [1] proposed a procedure of "TSN related QoS configuration for 5G virtual bridge" which can be an alternative to the Solution #18 "TSN-aware QoS profile generation" ([1] section 6.18.1.2.2).

U.S. Provisional Patent Application Ser. No. 62/805,727 entitled 5G SYSTEM SUPPORT FOR VIRTUAL TSN BRIDGE MANAGEMENT, QoS MAPPING AND TSN Qbv SCHEDULING, which is referred to herein as "the '727 application", introduced several options addressing the two stages of the control plane based QoS negotiation. In particular, the '727 application introduced:
  In one option, QoS flow(s) are pre-configured during the 5G bridge capability report phase. In such a case, the QoS flows with certain 5G QoS Indicators (5QIs) are established even if there is no TSN traffic going through QoS flows.

In another option, QoS flows are not pre-configured during the 5G bridge capability report phase. Rather, only the visibilities of the QoS flow are reported. Then, the QoS flow establishment is done during the Stage 2 bridge configuration phase.

The '727 application introduced three options of mapping TSN QoS parameters to 5G QoS profiles. Those options are based on a "control plane based QoS negotiation" method.

There are a few problems with the proposed solutions of the '727 application. In particular, these problems are:
1. The control plane based QoS mapping method relies on the IEEE 802.1Qcc centralized model, e.g. Centralized Network Configuration (CNC) or/and Central User Configuration (CUC). Therefore, it cannot be applied to a TSN network that does not have the CNC/CUC.
2. The '727 application proposed several methods of mapping TSN QoS parameters to 5G QoS profiles during the bridge configuration phase. The QoS mapping methods assumed that the QoS flows with corresponding QoS profiles for TSN traffic are not pre-established during the bridge capability report phase, i.e., the 5GS just reports available QoS profiles to the TSN network during the bridge capability report phase.
   a. Latency caused by signaling procedures of QoS flow establishment at the bridge configuration phase may be a problem. In a 5GS, the signaling procedures to establish a new QoS flow for a specific TSN traffic class are complex, which may include paging, service request, policy control, Protocol Data Unit (PDU) session modification, etc. The delay caused by the signaling procedures may exceed the performance requirement of TSN applications.
   b. Communication Service Availability is considered as an important service performance requirement for applications with deterministic traffic. For TSN applications, latency, survival, and system reliability are also the key factors of availability, because the system is considered unavailable to the TSN applications when message transfer time is larger than the maximum transfer latency. There may be a case in which the QoS profile is available during the bridge capability report phase but not available during the bridge configuration phase. Therefore, during the bridge configuration phase, a step of QoS flow verifications is needed in the proposed QoS mapping methods of the '727 application.

Embodiments of a solution are proposed herein that resolve several issues by providing a new procedure for the establishment of a static TSN connection between UE-side TSN Translator (UE/TT) (i.e., TT translator either being integrated into the UE or an independent unit communicatively coupled to the UE) and UPF-side TSN Translator (UPF/TT) (i.e., TT translator either being integrated into the UPF or an independent unit communicatively coupled to the UE) of the 5GS-as-a-bridge (model currently adopted in [1]).

Systems and methods are disclosed herein for the establishment of a static Time Sensitive Network (TSN) connection between User Equipment (UE)-side TSN Translator (UE/TT) and a User Plane Function (UPF)-side TSN Translator (UPF/TT) of a cellular communications system (e.g., a Fifth Generation (5G) System (5GS)) that operates as a bridge in the TSN.

Embodiments of a method of operation of a Session Management Function (SMF) and corresponding embodiments of a SMF are disclosed. In some embodiments, a method of operation of a SMF in a cellular communications system (e.g., a 5GS) to operate as a bridge for a TSN comprises communicating with one or more other network entities for a Protocol Data Unit (PDU) session establishment procedure in which an always on PDU session to the TSN is established, pre-establishing one or more Quality of Service (QoS) flows in the always on PDU session, and distributing one or more Packet Detection Rules (PDRs) to a UPF associated with the PDU session and/or distributing one or more QoS Rules to a UE associated with the PDU session, such that traffic classes of the TSN are bound to QoS flows in the cellular communications system.

With the solution disclosed herein, the 5GS really behaves as a bridge because the port to port connections are fixed and pre-established. There is no need for the CNC to trigger the establishment of the QoS flows in an existing PDU session. There is also no need to configure mapping tables between TSN traffic classes and QoS flows. Since the static connectivity is pre-established at user plane level, complex signaling procedures at the 5GS control plane and delays due to the signaling overhead are avoided.

The solution disclosed herein can improve the performance and capability of a 5G virtual TSN bridge in the following aspects:
1. Embodiments of the solution disclosed herein may provide a user plane based QoS mapping mechanism for TSN-5G QoS mapping, where the QoS mapping table is pre-configured in the user plane nodes. However, it does not limit the cases that the exchange of the QoS mapping table between control plane nodes and user plane nodes may apply.
2. Embodiments of the solution disclosed herein can be applied to the TSN network with or without CNC. They can be used for both control plane based QoS mapping (i.e., negotiation between 5GS and TSN) and user plane based QoS mapping.
3. Embodiments of the solution disclosed herein provide an option of using pre-established QoS flows during the bridge capability report (bridge onboarding) phase. Several potential benefits are:
   a. decreasing the latency caused by signaling procedures of QoS flow establishment at the bridge configuration phase, since the 5G QoS flows are already established at the bridge capability report phase;
   b. assuring service availability by the QoS flow establishment and the always on PDU session; and
   c. potentially simplifying the procedure of new TSN traffic initiation in a 5G virtual bridge via pre-established QoS flows and a pre-configured mapping table to TSN traffic classes (e.g., the QoS flow verification step during the 5G bridge configuration phase can be omitted).

Prior to describing embodiments of the present disclosure in greater detail, a brief discussion of the 5GS is beneficial. In this regard, FIG. 1 illustrates one example of a cellular communications system 100 in which embodiments of the present disclosure may be implemented. In the embodiments described herein, the cellular communications system 100 is a 5GS including a NR RAN (also referred to as a Next Generation (NG) RAN). In this example, the RAN includes base stations 102-1 and 102-2, which in the 5GS are referred to as gNBs, controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104.

The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5G Core (5GC). The base stations 102 (and optionally the low power nodes 106) are connected to the core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Figure 2:
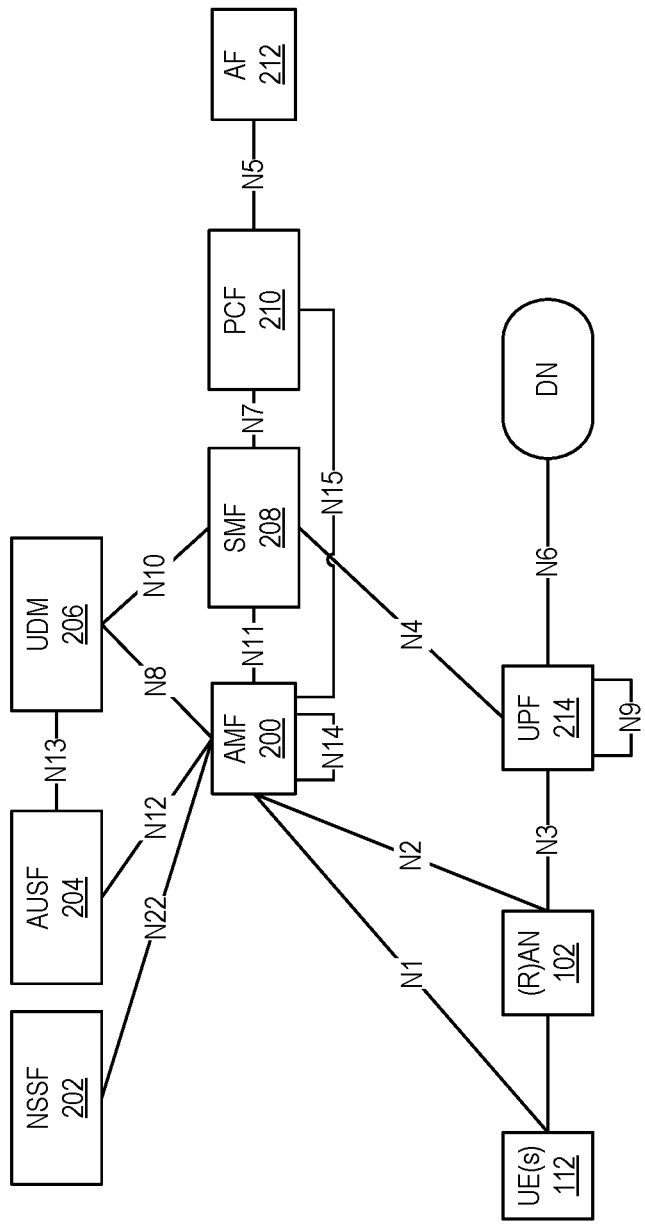
FIGS. 2 and 3 illustrate example Fifth Generation (5G) System (5GS) architectures.

FIG. 2 illustrates a wireless communication system represented as a 5G network architecture composed of core NFs, where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a Radio Access Network (RAN) or an Access Network (AN) as well as an AMF 200. Typically, the R(AN) comprises base stations 102, e.g. such as eNBs or gNBs or similar. Seen from the core network side, the 5G core NFs shown in FIG. 2 include a Network Slice Selection Function (NSSF) 202, an AUSF 204, a UDM 206, the AMF 200, a SMF 208, a PCF 210, an Application Function (AF) 212, and a User Plane Function (UPF) 214.

Reference point representations of the 5G network architecture are used to develop detailed call flows in the normative standardization. The N1 reference point is defined to carry signaling between the UE 112 and the AMF 200. The reference points for connecting between the AN and the AMF 200 and between the AN and the UPF 214 are defined as N2 and N3, respectively. There is a reference point, N11, between the AMF 200 and the SMF 208. N4 is used by the SMF 208 and the UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and the SMF 208, respectively. N12 is required for the AMF 200 to perform authentication of the UE 112. N8 and N10 are defined because the subscription data of the UE is required for the AMF 200 and the SMF 208.

The 5G core network aims at separating user plane and control plane. The user plane carries user traffic while the control plane carries signaling in the network. In FIG. 2, the UPF 214 is in the user plane and all other NFs, i.e., the AMF 200, SMF 208, PCF 210, AF 212, NSSF 202, AUSF 204, and UDM 206, are in the control plane. Separating the user and control planes guarantees each plane resource to be scaled independently. It also allows UPFs 214 to be deployed separately from control plane functions in a distributed fashion. In this architecture, UPFs 214 may be deployed very close to UEs 112 to shorten the Round Trip Time (RTT) between UEs 112 and data network for some applications requiring low latency.

The core 5G network architecture is composed of modularized functions. For example, the AMF 200 and SMF 208 are independent functions in the control plane. Separated AMF 200 and SMF 208 allow independent evolution and scaling. Other control plane functions like the PCF 210 and AUSF 204 can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs 214.

Figure 3:
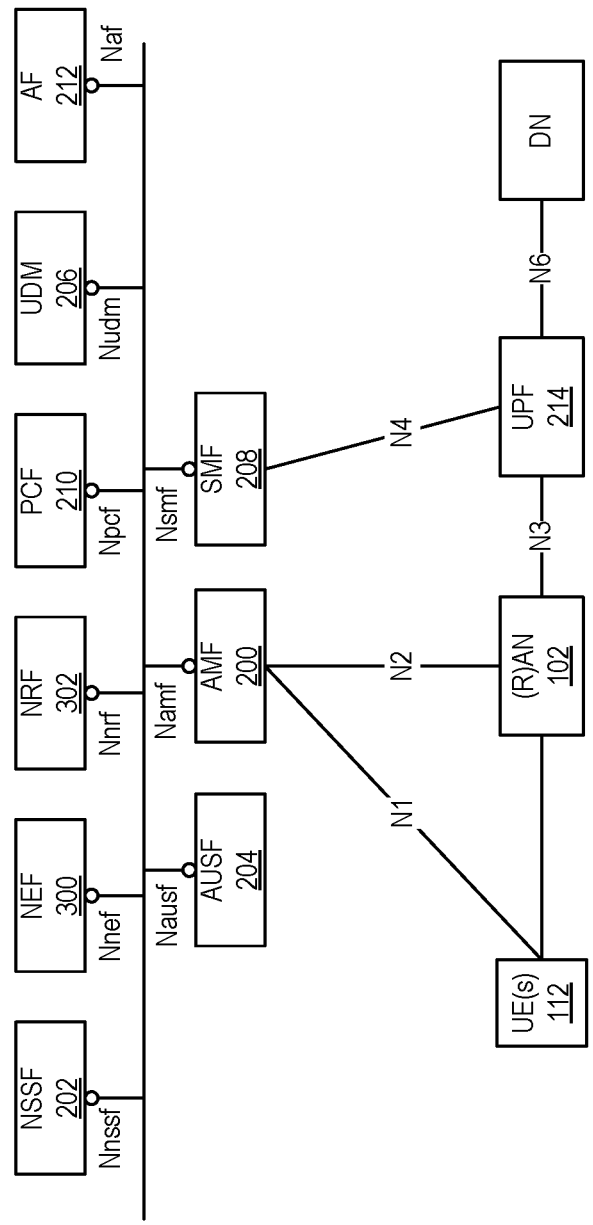

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF 200 and Nsmf for the service based interface of the SMF 208, etc. The Network Exposure Function (NEF) 300 and the NRF 302 in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates IP addresses to UEs 112. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support QoS. Based on the information, the PCF 210 determines policies about mobility and session management to make the AMF 200 and SMF 208 operate properly. The AUSF 204 supports authentication function for UEs 112 or similar and thus stores data for authentication of UEs 112 or similar while the UDM 206 stores subscription data of the UE 112. The Data Network (DN), which is not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 4:
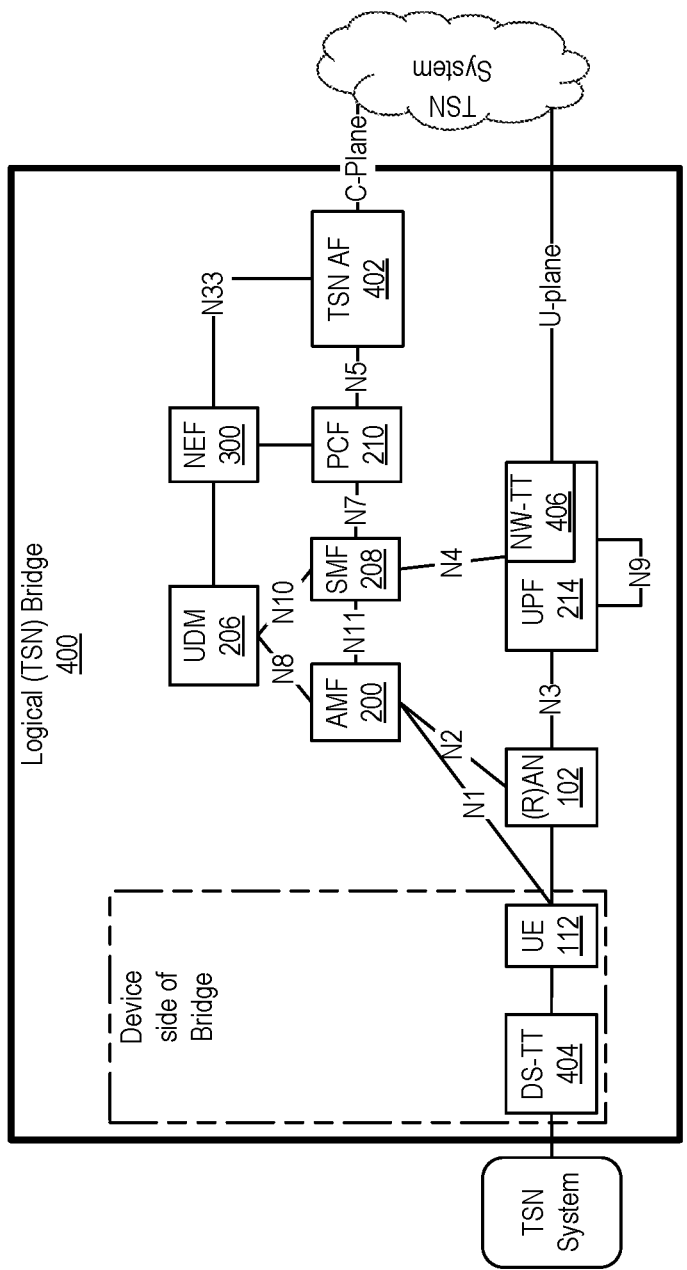
FIG. 4 illustrates one example of a system in which a 5GS operates as a bridge in a Time Sensitive Network (TSN) and in which embodiments of the present disclosure may be implemented.

Embodiments of the present disclosure more specifically relate to the 5GS appearing as a TSN bridge for integration with a TSN. In this regard, FIG. 4, which is a reproduction of FIG. 4.4.8.2-1 of Change Request (CR) S2-1906754 for 3GPP Technical Specification (TS) 23.501, shows one example of an architecture in which a 5GS appears as a TSN bridge. Reference numbers have been added to FIG. 4. As illustrated, the 5GS appears as a virtual, or logical, TSN bridge 400. As shown in FIG. 4 and discussed above, the 5GS includes a UE 112, a (R)AN including one or more RAN nodes (shown as reference number 102 in this example, which corresponds to a base station 102), and a number of core network nodes (also referred to herein as core network functions). As illustrated, the core network nodes include the AMF 200, the UDM, the SMF, the PCF, the NEF, and the UPF. Further, in this example, there is also a TSN AF 402, a TSN Translator (TT) at the UE-side which is denoted in FIG. 4 as a DS-TT 404 (also referred to herein as UE side TT or UE/TT), and a TSN TT at the UPF-side which is denoted in FIG. 4 as NW-TT 406 (also referred to herein as UPF side TT or UPF/TT). In this example, the DS-TT 404 is shown outside of the UE 112, and the NW-TT 406 is shown inside of the UPF. However, in other embodiments, the DS-TT 404 is alternatively implemented within the UE 112 and/or the NW-TT 406 is alternatively implemented outside of the UPF 214.

In accordance with embodiments of the present disclosure, the 5GS is configured to behave as a TSN bridge 400 whose port-to-port connections are fixed and pre-established. The following aspects are considered to maintain the static TSN connection in the 5GS:
I. Always-on PDU session
II. QoS Flow Pre-configuration
III. TSN-5G QoS mapping table pre-configured in user plane
IV. TSN traffic transmission
V. Example Implementation I. Always-on PDU Session The deactivation of the User Plane (UP) connection of an existing PDU Session causes the corresponding data radio bearer and N3 tunnel to be deactivated. To maintain the static connection with the TSN and avoid the latency caused by the signaling procedure of UP connection activation, the deactivation of the UP connection should be avoided.

The PDU Session that is connected to the TSN may be established as an always-on PDU Session. In this case, the SMF 208 should not deactivate a UP connection of this PDU Session due to inactivity.

II. QoS Flow Pre-Configuration (Pre-Establishment)

QoS flows are pre-configured (or pre-established) during the 5G bridge capability report phase, also referred to as the bridge onboarding phase. In such a case, the QoS flows with certain 5QIs are established even if there is no TSN traffic going through the QoS flows.

The QoS information may be pre-configured in the SMF 208 or the UE 112.
  Pre-configuration in SMF 208: When the UE 112 establishes a PDU session to the specified TSN, the SMF 208 establishes the required QoS flows for the UE 112 based on pre-configured QoS profiles. For more detail refer to clause 4.3.2 of [3].
  Pre-configuration in UE 112: If QoS requirements for the TSN are pre-configured in the UE 112, after successful PDU session establishment, then the UE 112 initiates the procedure of PDU session modification, which includes TSN related QoS rules for the request of QoS handling. Then, the corresponding QoS flows for the TSN traffic can be established.

III. TSN-5G QoS Mapping Table Pre-Configuration in User Plane

Figure 12:
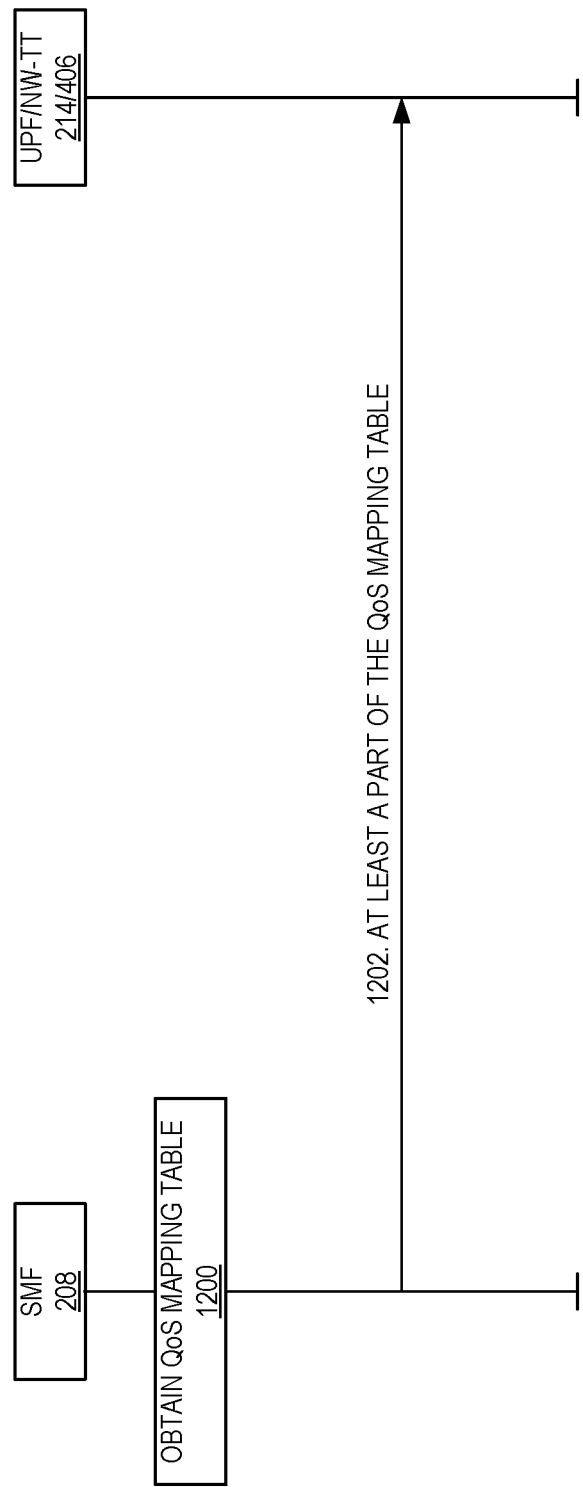
FIG. 12 illustrates a procedure for distributing a part of a table from the Session Management Function (SMF) to the User Plane Function (UPF) or the TSN Translator (TT) at the UPF side according to some embodiments of the present disclosure.

SMF 208 based pre-configuration:
If the QoS flows are pre-configured in the SMF 208, the SMF 208 maintains the mapping table of TSN traffic classes and binds the traffic classes to QoS flows. The SMF 208 assigns the QoS Flow Identity (QFI) for a new QoS Flow and derives its QoS profile, uplink and downlink Packet Detection Rule(s) (PDR(s)), and QoS Rule(s). For more detail refer to clause 5.7 of [2].
Uplink and downlink PDR(s) are provided by the SMF 208 to the UPF 214. The UPF 214 maps UP traffic (e.g., different traffic classes) to QoS Flows based on the PDRs.
QoS Rules are provided by the SMF 208 to the UE 112 via the AMF 200 over the N1 reference point. The UE 112 performs the association of uplink traffic to QoS Flows, based on QoS rules.
A QoS profile provided by the SMF 208 to the AN 102 via the AMF 200 over the N2 reference point or preconfigured in the AN 102.
In a case of using IEEE 802.1Qcc CNC, part of the table (e.g., available TSN traffic classes that associated with a bridge Identifier (ID) and port ID) is reported to the AF 402 during the capability report phase. In such a case, the CNC is aware of available TSN traffic classes.
In a case that CNC is not available (e.g., IEEE 802.1Qcc fully distributed model), the 5GS will collect information of required parameters to be available for the TSN network (a similar concept as the bridge capability report phase in the CNC case). Part of the table (e.g., available TSN traffic classes that are associated with a bridge ID and port ID) can be distributed from the SMF 208 to the UPF 214 or the TT (TSN translator) at the UPF side (i.e., the NW-TT 406). This is illustrated in FIG. 12. In particular, as illustrated in FIG. 12, the SMF 208 obtains the QoS mapping table (step 1200). The SMF 208 can obtain the QoS mapping table in any manner described herein. The SMF 208 then distributes at least a part of the QoS mapping table to the UPF 214 or NW-TT 406 (step 1202). As described herein, in some embodiments, the QoS mapping table is pre-configured. As also described herein, in some embodiments, the QoS flows include QoS flows that are pre-established.
Variation1: The SMF 208 may have a different "pre-configured" mapping table for different UPFs. Based on other aspects, e.g. depending on how the 5G bridge is modelled.
Variation2: The mapping table may be directly pre-configured (stored) in the UPF 214.
UE based pre-configuration:
If the QoS rules are pre-configured in the UE 112, the UE 112 maintains the mapping table between TSN traffic classes and a QoS request. The UE 112 requests specific QoS handling for selected traffic classes. The PDU Session Modification Request includes Packet Filters describing the traffic classes. The request for the specific QoS is sent to the SMF 208 via AMF 200 over N1 reference point.
The SMF 208 assigns the QFI for a new QoS Flow and derives its QoS profile, uplink and downlink PDR(s), and QoS Rule(s) based on UE QoS request. The QoS rules are delivered to the UE 112 via the response to the AMF 200. The SMF 208 updates the UPF 214 with uplink PDRs for the new QoS flows.

IV. TSN Traffic Handling a. Case 1 with CNC (e.g., Applies for Fully Centralized Model and Centralized Network/Distributed User Model)

Based on the stream requirements from End Stations in the TSN, the CNC computes a transmission schedule and network paths. The CNC distributes the TSN QoS requirements and TSN scheduling parameters (specific for current node) to the 5G virtual bridge via the TSN AF 402.

For a 5G virtual bridge 400 with static TSN connection, related QoS flows have already been established, and the TSN AF 402 may not need to trigger PDU session modification procedure for the establishment of QoS Flows.

In a system using time-aware scheduling to meet QoS requirements (IEEE 802.1Qbv [5]), and when the Managed Objects on the 5G virtual bridge 400 are modified for traffic scheduling (e.g., change of gate control list), the information is delivered to the DS-TT 404 and the NW-TT 406.

If the CNC indicated it could support the end stations' QoS requirements, the CUC configures Talkers and Listeners for stream transmission (this procedure is out of the scope of 3GPP), and communication begins.

Figure 5:
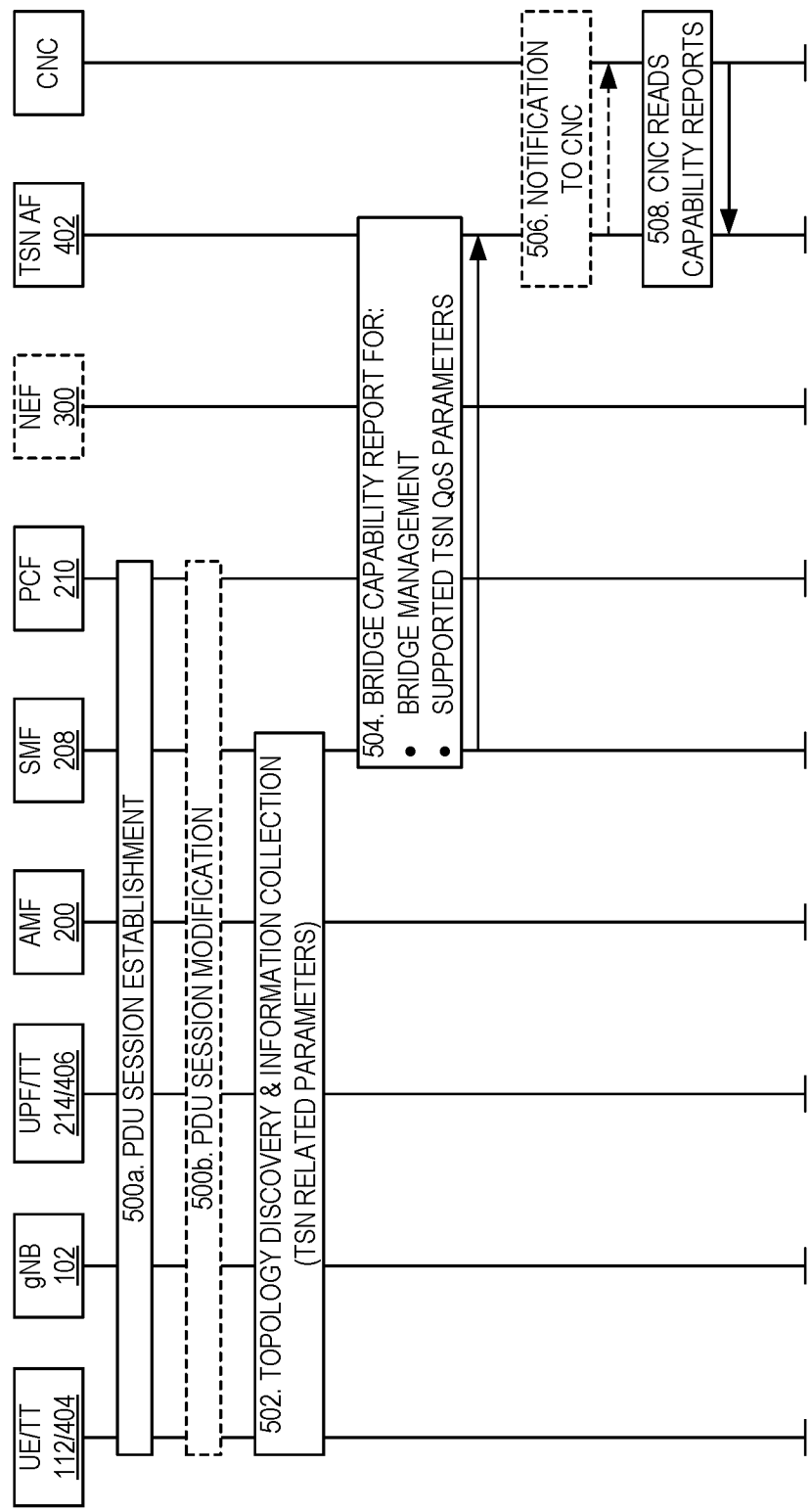
FIG. 5 illustrates a procedure for User Equipment (UE) onboarding and virtual bridge capability reporting with Centralized Network Configuration (CNC) in accordance with some embodiments of the present disclosure.

FIG. 5 illustrates a procedure for UE onboarding and virtual bridge capability reporting with CNC in accordance with some embodiments of the present disclosure. The steps of the procedure illustrated in FIG. 5 are described below:

Step 500a: Based on UE request or trigged via network, a PDU session is established to the TSN. The PDU Session that is connected to the TSN may be established as an always-on PDU Session. As used herein, an "always-on" PDU session is as defined in 3GPP TS 23.502 V16.0.2, Section 5.6.13, which states "[a]n always-on PDU session is a PDU session for which User Plane resources have to be activated during every transition from CM-IDLE mode to CM-CONNECTED state." As discussed above, if the 5GS QoS profiles (i.e., the 5GS QoS profiles related to the TSN) and corresponding TSN traffic classes are pre-configured (mapping table) in the SMF 208, the SMF 208 establishes the required QoS flows in the PDU session and binds the traffic classes with the QoS flows via distributing PDRs in the UPF 214 and QoS rules in the UE 112. Note that distributing the PDRs to the UPF 214 and the QoS rules to the UE 112 is part of the PDU session establishment procedure.

Variation 1: The pre-establishment of QoS flows is based on the pre-configured mapping table at the SMF 208 or the PCF 210.

Variation 2: The pre-establishment of QoS flows is based on the available 5G resources. The SMF 208 or PCF 210 holds a mapping table of all QoS flows. Then, based on the established QoS flows, the SMF 208 or PCF 210 will select part of the mapping table and reports to the AF 402 (in CNC case). In a case without CNC, then the 208 SMF or UPF 214 may select part of the mapping table for the TSN network to use.

Step 500b (Optional): As discussed above, if the 5GS QoS profiles and corresponding TSN traffic classes are pre-configured in the UE 112, after successful PDU session establishment, the UE 112 initiates the procedure of PDU session modification, which includes TSN related QoS rules for the handling of TSN traffic classes. In other words, using the PDU session modification procedure, the UE 112 provides information regarding the QoS profiles and corresponding traffic classes to the network (e.g., to the SMF 208). This information may include QoS requirements for the TSN. Then, based on the information obtained from the UE 112, the SMF 208 establishes all the required QoS flows and bind the traffic classes with QoS flows (mapping table) via distributing PDRs in the UPF 214 and QoS rules in the UE 112. Note that distributing the PDRs to the UPF 214 and the QoS rules to the UE 112 is part of the PDU session modification procedure.

Step 502: Based on a request from the SMF 208, the TTs in the UE side and UPF side (i.e., the DS-TT 404 and the NW-TT 406) collect network topology, propagation delay, and TSN related information and provide this information to the SMF 208.

Step 504: TSN bridge management information (bridge ID, port ID) and supported QoS parameters for the TSN are reported to the TSN AF 402 based on SMF event notification (directly or via NEF 300).

Step 506 (Optional): The TSN AF 402 may notify the CNC to read the capability report, e.g. when bridge capability changes/update events happen.

Step 508: The CNC reads the capability report from 5GS virtual bridge(s).

Note that steps 502 through 508 are the same as the corresponding steps performed in the '727 application.

Figure 6:
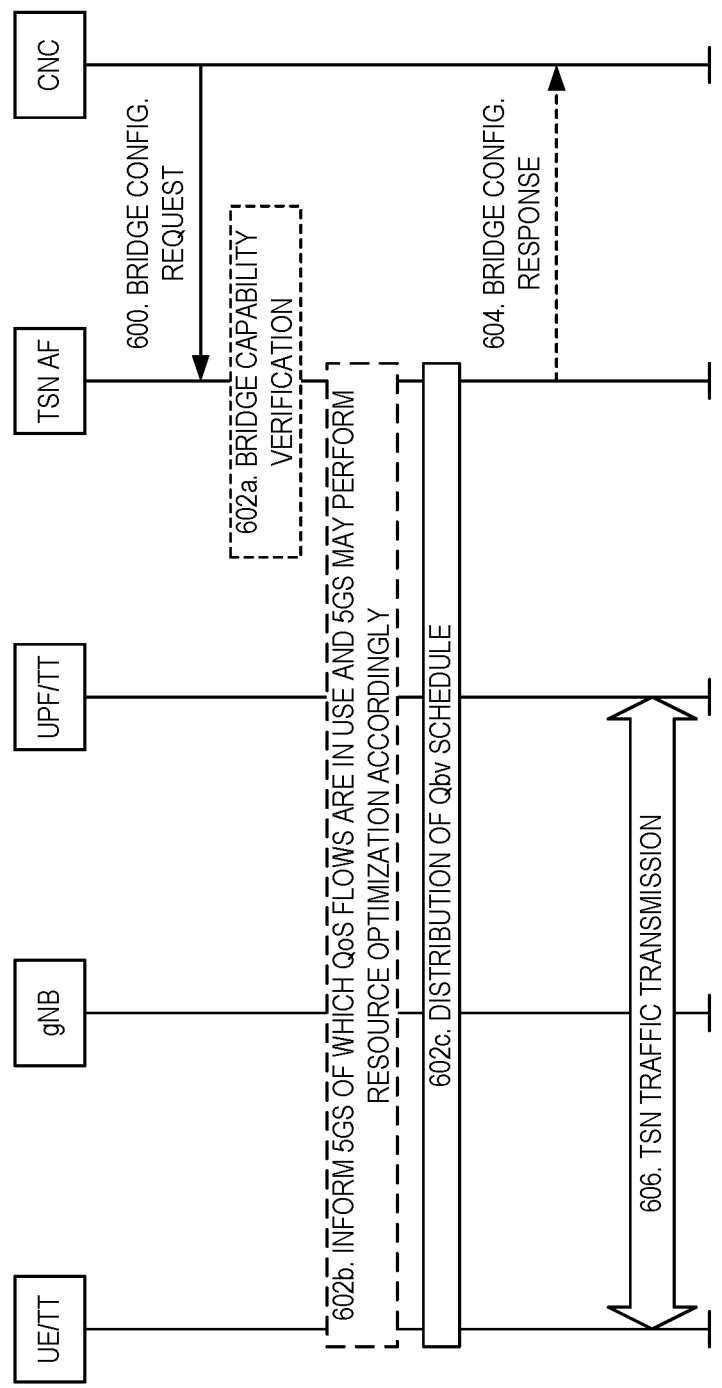
FIG. 6 illustrates a procedure for virtual bridge configuration and traffic transmission with CNC in accordance with some embodiments of the present disclosure.

FIG. 6 illustrates a procedure for virtual bridge configuration and traffic transmission with CNC in accordance with some embodiments of the present disclosure. The steps of the procedure of FIG. 6 are described below:

Step 600: Based on the stream requirements from End Stations of the TSN, the CNC computes a transmission schedule and network paths. The CNC distributes the TSN QoS requirements and TSN scheduling parameters (specific for current node) to the 5G virtual bridge via the TSN AF.

Step 602: Since the QoS flows are already pre-established and reported to CNC for TSN usage, the bridge configuration does not need to setup 5G QoS flows; however, there may be optional functions.

Step 602a (Optional): The TSN AF may verify the capability of the bridge to check if it can still meet the request from CNC, and related resources are available.

Step 602b (Optional): Also if QoS flows are pre-established. The TSN network (e.g., CNC) may only select some of the QoS flows. Therefore, the AF can inform 5GS of which QoS flows are actually in use, and then the 5GS can make further resource optimization, e.g. use others for redundancy.

Step 602c: AF may take actions other than QoS mapping, e.g. to deliver other TSN parameters (Qbv schedule, Time Sensitive Communication Assistance Information) to relevant 5G nodes.

Step 604 (Optional): TSN AF responds to CNC.

Step 606: If the CNC indicated it could support the end stations' QoS requirements, the CUC configures Talkers and Listeners for stream transmission (this procedure is out of the scope of 3GPP), and the new TSN stream traffic can be transmitted in the 5G virtual bridge.

b. Case 2—No CNC (e.g., Applies for Fully Distributed Model)

In a case that CNC is not available (e.g., IEEE 802.1Qcc fully distributed model), the 5GS will collect information of required parameters to be available for the TSN network (similar concept as the bridge capability report phase in the CNC case). Part of the table (e.g., available TSN traffic classes that associated with a bridge ID and port ID) can be distributed from the SMF to the UPF or the TT (TSN translator) at the UPF side.

The corresponding traffic filters (PDRs) and QoS Rules are pre-configured to bind QoS flows and traffic classes/priorities of incoming traffic at the UPF (downlink traffic) and UE (uplink traffic), respectively.

V. Example Implementation

One example implementation of at least some aspects of the present disclosure will now be described. In 23.501, section 5.29.1 the following operations has been specified:

In order to support TSN traffic scheduling over 5GS Bridge, the 5GS supports the following functions:
  Report the bridge information of 5GS Bridge to TSN network.
  Map the configuration information obtained from TSN network for 5GS Bridge into 5GS QoS within PDU Session and TSC Assistance Information for efficient time-aware scheduling, as defined at clause 5.29.2.

Bridge information reported to the CNC includes 802.1Qcc bridge delay attributes for the 5GS ports to be used for the path through the 5GS. Since these ports correspond to the UE and UPF, the UE must register, and establish a PDU Session for which one or more UPFs are selected. Once the UE and UPF are known, the 5GS can report bridge information to the TSN network, and the CNC can calculate port configuration using 802.1Qbv (as stipulated in 23.501, 5.29.2).

There are two options for supporting 5GS QoS.
1. Pre-Configured/Static QoS: 5GS QoS for TSC streams is pre-configured or setup at PDU Session Establishment, prior to receiving path configuration information from the CNC. In this case TCSAI and other stream specific characteristics are not known, there is no TSC stream specific QoS applied in the 5GS, and default QoS parameters for the TSC 5QI must be used. AF triggered PDU Session Modification due to reception of 802.1Qbv Gate Parameter Tables is not required.
2. Dynamic QoS: QoS for TSC streams is established via PDU Session Modification after the CNC has determined the e2e path and provided 802.1Qbv Gate Parameter Tables for the Egress port, and optionally other information has been provided to the AF that indicates the TSC stream QoS requirements (e.g.: information sent directly from a CUC to the AF). To modify the PDU session after receiving configuration information from the TSN network, a binding must be established between the PDU Session and Bridge Configuration information provided by 802.1Qbv. That way when the configuration information is received from the CNC, the PDU session to be modified is known.

802.1Qbv provides a Gate Parameter Table for 5GS bridge egress ports. For each traffic class on the port, a Gate Control List specifies a transmission gate state of "open" or "closed" as a function of time, independent of TSN Stream ingress ports. Furthermore, while the CNC calculations accommodate all TSN Streams for all UEs/PDU Sessions on an egress Port, the bridge only receives per-port, per-traffic class information. 802.1Qbv does not provide stream level and ingress port information to the bridge. Hence the possible identifiers from the CNC that may be used to identify the PDU session are egress port Bridge ID and Port ID. We assume Traffic Class will be mapped to QoS Flow, as has been suggested in several contributions.

There are two cases to consider:

Downlink streams at the UE Egress Port: At PDU Session Establishment, the PDU Session may be uniquely bound to the Port ID assigned to the UE. When the CNC provides 802.1Qbv configuration information for that UE Port, a PDU Session Modification may be triggered based on the binding.

Note that the gate states for a traffic class carrying a TSN Stream(s) will reflect the open/closed needs of that stream(s) as a function of time. A 5GS QoS Flow that is mapped to a traffic class carrying the TSN traffic may be modified accordingly.

Uplink Streams at a UPF Egress Port: Several bridge configuration options have been considered in S2-190172 and subsequent revisions.
  If the 5GS Bridge is configured as a "per PDU Session based 5G bridge" (Option 4, where each UE/PDU Session is a logical bridge), then at PDU Session Establishment, the PDU Session may be uniquely bound to the Bridge ID. When the CNC provides 802.1Qbv configuration information for that that Bridge ID, a PDU Session Modification may be triggered based on the binding.
  If the 5GS Bridge is configured as a "per UE based 5G bridge" (Option 3, where each UE/PDU Session is a logical bridge), then at PDU Session Establishment, the PDU Session may be uniquely bound to the Bridge ID and UPF Port ID. When the CNC provides 802.1Qbv configuration information for that UPF Port ID and Bridge ID, a PDU Session Modification may be triggered based on the binding.
  As in the case of downlink streams, the gate states for a traffic class carrying a TSN Stream(s) will reflect the open/closed needs of that stream(s) as a function of time. A 5GS QoS Flow that is mapped to the traffic class carrying the TSN traffic may be modified accordingly.

For other 5GS bridge configurations, such as a monolithic 5GS Bridge, or a per-UPF based logical bridge (one 5GS bridge per-UPF), either:
1. At PDU Session Establishment, the PDU Session must be bound to a unique UPF Port ID that is then supplied to the CNC for path calculations. While the physical UPF port does not change, the UPF Port ID supplied to the CNC must be unique to a PDU Session. The suitability of this option may depend on CNC capabilities, or
2. Option 1 described above will apply as the PDU Session cannot be determined from the 802.1Qbv port configuration information.

To accommodate the various scenarios described above for uplink and downlink TSN streams, it is proposed that at PDU Session setup, the PDU Session is bound to a Unique UE Port ID, a UPF Port ID and a Bridge ID. The SMF assigns the IDs (e.g.: a unique UPF Port ID for a PDU session or a common UPF port ID for the UPF physical port) according to 5GS bridge configuration and the type of QoS (preconfigured/static or dynamic) desired by the operator. This approach provides flexibility to support future bridge configuration methods that provide per-stream visibility (e.g.: 802.1Qci).

Considering the above, one example implementation of some aspects of embodiments of the present disclosure may be expressed as a Change Request (CR) to 23.501 V16.0.2 as follows:

via, e.g., a wired connection (e.g., an optical cable). However, in some other embodiments, the radio unit(s) 710 and potentially the antenna(s) 716 are integrated together with the control system 702. The one or more processors 704 operate to provide one or more functions of the network node 700 as described herein (e.g., one or more functions of a gNB, UPF, UPF-side TT, TSN AF, AMF, SMF, PCF, NEF, or the like, as described herein, e.g., with respect to FIGS. 5 and 6). In some embodiments, the function(s) are implemented in software that is stored, e.g., in the memory 706 and executed by the one or more processors 704.

---

5.28.2 QoS parameters mapping for 5GS Bridge configuration

~~In order to schedule TSN traffic over 5GS Bridge, the configuration information of 5GS Bridge~~ is mapped to 5GS
~~QoS within the corresponding PDU Session.~~ When 5GS is integrated as a bridge, following are
~~The~~ the configuration information of 5GS Bridge ~~as defined in 802.1Qbv~~
~~[z], includes the following~~:
    Bridge ID of 5GS Bridge.
    Configuration information of scheduled traffic on ports of the TT:
        Egress ports of 5GS Bridge, e.g., ports on UE side or ports on UPF side.
        Traffic classes and their priorities.
        Ingress ports of 5GS Bridge, if needed.
    Editor's note: Additional information, if needed, is PPS.
<u>QoS for TSC streams may be pre-configured, setup during PDU Session Establishment or modified via PDU Session Modification after the TSN network (eg: CNC) has determined the end-to-end path and provided the AF/TT with 802.1Qbv Gate Parameter Tables for the 5GS egress port, and optionally other information has been provided to the AF/TT that indicates the TSC stream QoS requirements (eg: information sent directly from a CUC to the AF/TT). To modify the PDU session after receiving configuration information from the TSN network, a binding must be established between the PDU Session and the Bridge Configuration information provided by 802.1 Qbv[z].
To flexibly support various 5GS bridge options, a binding is established between each PDU session and:
1. A unique UE Port ID
2. A Logical Bridge ID
3. A Logical UPF Port ID
4. A UE Port MAC Address
5. A UPF Port MAC Address
The SMF determines the Bridge ID and UPF Port ID granularity (eg: a unique UPF Port ID for a PDU session vs unique for a UPF physical port, or a unique Bridge ID for a UE, vs for a UPF, etc.) according to 5GS bridge characteristics, TSN configuration (CNC) capabilities and whether dynamic QoS is required. This approach provides flexibility to support 5GS Bridges with varying granularity and can be used to support additional bridge configuration methods (eg: with per-stream visibility using 802.1Qci).</u>
~~The association between binding information in the UE, 5GS Bridge ID and port on UE side is maintained and further used to assist to bind the TSN traffic with the UE.~~
   ~~Editor's note: The details on the binding information in the UE is FFS.~~
The mapping table between the traffic class and 5GS QoS Profile is provisioned and further used to find suitable 5GS QoS profile to transfer TSN traffic over the PDU Session.
   Editor's note: The NF (AF or PCF) performing the mapping for TSN traffic scheduling information is FFS.

---

VI. Additional Aspects

Figure 7:
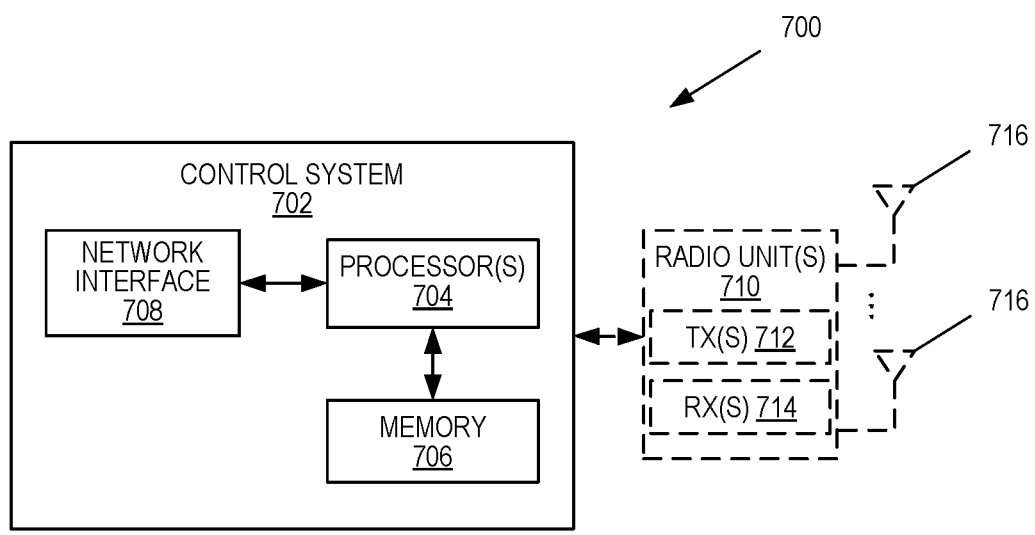
FIG. 7 is a schematic block diagram of a network node according to some embodiments of the present disclosure.

FIG. 7 is a schematic block diagram of a network node 700 according to some embodiments of the present disclosure. The network node 700 may be, for example, a base station 102 or 106 (e.g., a gNB) or a network node that implements a core network entity such as, e.g., a UPF, a UPF-side TT that is separate from the UPF, a TSN AF, an SMF, a PCF, or some other core network entity. As illustrated, the network node 700 includes a control system 702 that includes one or more processors 704 (e.g., Central Processing Units (CPUs), Application Specific Integrated Circuits (ASICs), Field Programmable Gate Arrays (FPGAs), and/or the like), memory 706, and a network interface 708. The one or more processors 704 are also referred to herein as processing circuitry. In addition, if the network node 700 is a radio access node, the network node 700 includes one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702

Figure 8:
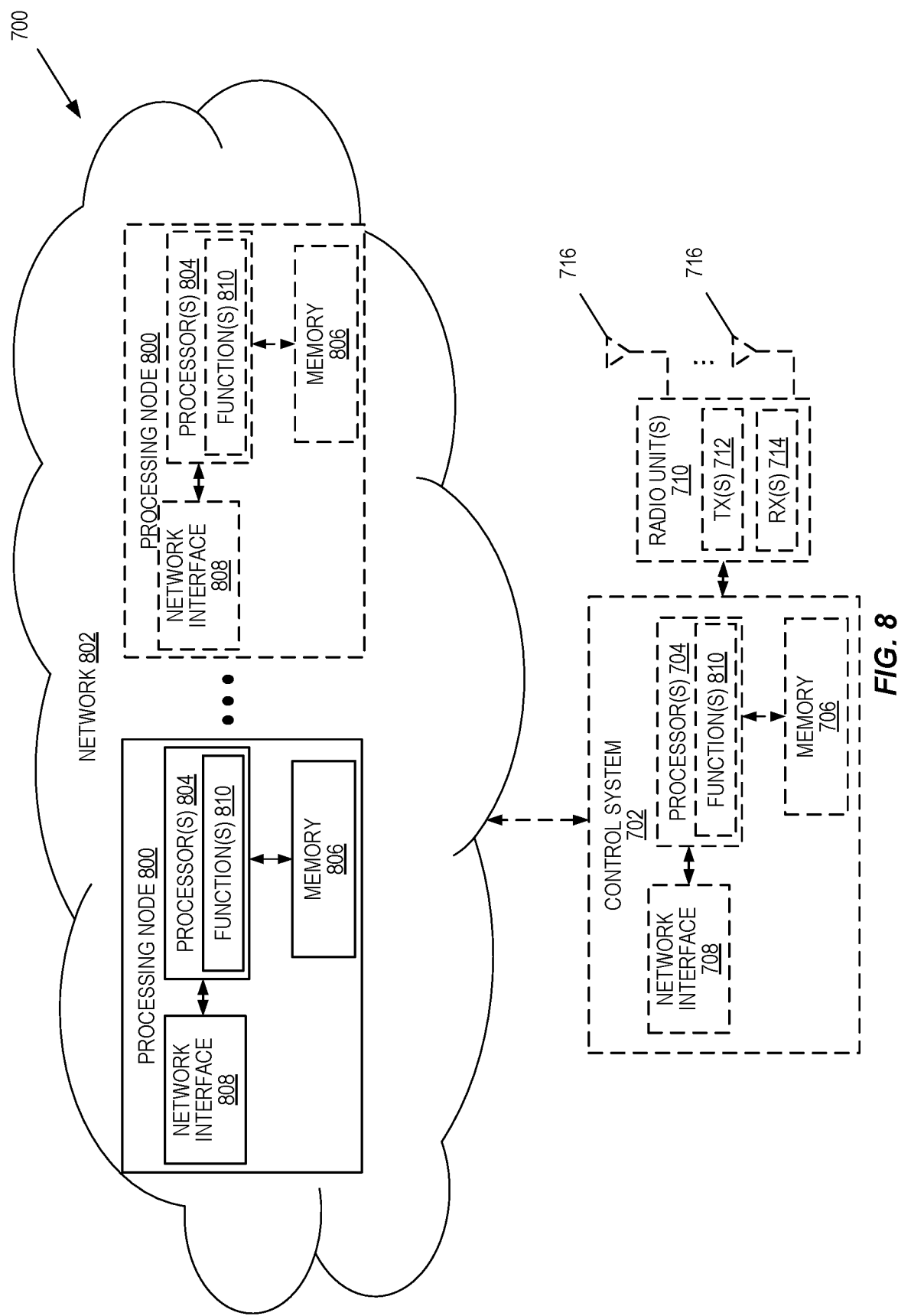
FIG. 8 is a schematic block diagram that illustrates a virtualized embodiment of the network node of FIG. 7 according to some embodiments of the present disclosure.

FIG. 8 is a schematic block diagram that illustrates a virtualized embodiment of the network node 700 according to some embodiments of the present disclosure. As used herein, a "virtualized" network node is an implementation of the network node 700 in which at least a portion of the functionality of the network node 700 is implemented as a virtual component(s) (e.g., via a virtual machine(s) executing on a physical processing node(s) in a network(s)). As illustrated, in this example, the network node 700 includes one or more processing nodes 800 coupled to or included as part of a network(s) 802 via the network interface 708. Each processing node 800 includes one or more processors 804 (e.g., CPUs, ASICs, FPGAs, and/or the like), memory 806, and a network interface 808. If the network node 700 is a radio access node, the network node 702 also includes the radio unit(s) 710 and, optionally, the control system 702 and/or the one or more radio units 710. Note that if the radio access node includes the radio unit(s) 710 but not the control system 702, then the radio unit(s) 710 include a network interface that communicatively couples the radio unit(s) 710 to the network 802.

In this example, functions 810 of the network node 700 described herein (e.g., one or more functions of a gNB, UPF, UPF-side TT, TSN AF, AMF, SMF, PCF, NEF, or the like, as described herein, e.g., with respect to FIGS. 5 and 6) are implemented at the one or more processing nodes 800 or distributed across the control system 702 and the one or more processing nodes 800 in any desired manner. In some particular embodiments, some or all of the functions 810 of the radio access node 700 described herein (e.g., one or more functions of a gNB, UPF, UPF-side TT, TSN AF, AMF, SMF, PCF, NEF, or the like, as described herein, e.g., with respect to FIGS. 5 and 6) are implemented as virtual components executed by one or more virtual machines implemented in a virtual environment(s) hosted by the processing node(s) 800.

In some embodiments, a computer program including instructions which, when executed by at least one processor, causes the at least one processor to carry out the functionality of the network node 700 or a node (e.g., a processing node 800) implementing one or more of the functions 810 of the network node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
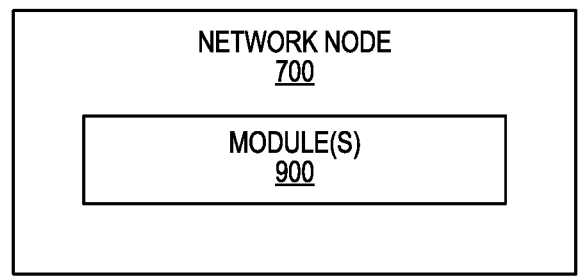
FIG. 9 is a schematic block diagram of the network node of FIG. 7 according to some other embodiments of the present disclosure.

FIG. 9 is a schematic block diagram of the network node 700 according to some other embodiments of the present disclosure. The network node 700 includes one or more modules 900, each of which is implemented in software. The module(s) 900 provide the functionality of the network node 700 described herein. This discussion is equally applicable to the processing node 800 of FIG. 8 where the modules 900 may be implemented at one of the processing nodes 800 or distributed across multiple processing nodes 800 and/or distributed across the processing node(s) 800 and the control system 702.

Figure 10:
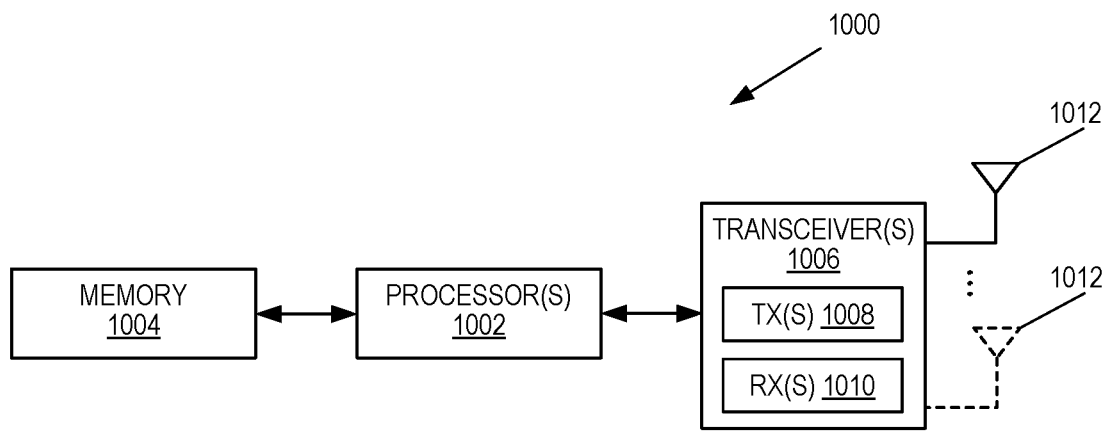
FIG. 10 is a schematic block diagram of a UE according to some embodiments of the present disclosure.

FIG. 10 is a schematic block diagram of a UE 1000 according to some embodiments of the present disclosure. As illustrated, the UE 1000 includes one or more processors 1002 (e.g., CPUs, ASICs, FPGAs, and/or the like), memory 1004, and one or more transceivers 1006 each including one or more transmitters 1008 and one or more receivers 1010 coupled to one or more antennas 1012. The transceiver(s) 1006 includes radio-front end circuitry connected to the antenna(s) 1012 that is configured to condition signals communicated between the antenna(s) 1012 and the processor(s) 1002, as will be appreciated by on of ordinary skill in the art. The processors 1002 are also referred to herein as processing circuitry. The transceivers 1006 are also referred to herein as radio circuitry. In some embodiments, the functionality of the UE 1000 (and/or the UE-side TT) described above may be fully or partially implemented in software that is, e.g., stored in the memory 1004 and executed by the processor(s) 1002. Note that the UE 1000 may include additional components not illustrated in FIG. 10 such as, e.g., one or more user interface components (e.g., an input/output interface including a display, buttons, a touch screen, a microphone, a speaker(s), and/or the like and/or any other components for allowing input of information into the UE 1000 and/or allowing output of information from the UE 1000), a power supply (e.g., a battery and associated power circuitry), etc.

In some embodiments, a computer program including instructions which, when executed by at least one processor, causes the at least one processor to carry out the functionality of the UE 1000 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
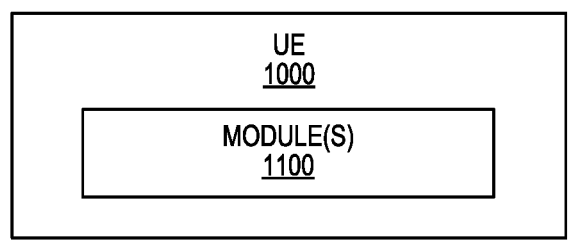
FIG. 11 is a schematic block diagram of the UE of FIG. 10 according to some other embodiments of the present disclosure.

FIG. 11 is a schematic block diagram of the UE 1000 according to some other embodiments of the present disclosure. The UE 1000 includes one or more modules 1100, each of which is implemented in software. The module(s) 1100 provide the functionality of the UE 1000 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method of operation of a Session Management Function, SMF, in a cellular communications system (e.g., a Fifth Generation, 5G, System, 5GS) to operate as a bridge for a Time Sensitive Network, TSN, the method comprising one or more of the following actions:
communicating (500a) with one or more other network entities for a Protocol Data Unit, PDU, session establishment procedure in which an always on PDU session to the TSN is established;
pre-establishing (500a or 500b) one or more Quality of Service, QoS, flows in the always on PDU session; and
distributing (500a or 500b) one or more Packet Detection Rules, PDRs, to a User Plane Function, UPF, associated with the always on PDU session and/or distributing (500a or 500b) one or more QoS Rules to a User Equipment, UE, associated with the always on PDU session, such that traffic classes of the TSN are bound to QoS flows in the cellular communications system.

Embodiment 2: The method of embodiment 1 wherein a User Plane, UP, connection of the always on PDU session is not deactivated due to inactivity.

Embodiment 3: The method of embodiment 1 or 2 wherein establishing the one or more QoS flows comprises establishing the one or more QoS flows based on preconfigured information.

Embodiment 4: The method of any one of embodiments 1 to 3 wherein the one or more PDRs distributed to the UPF are based on preconfigured information and/or the one or more QoS Rules distributed to the UE are based on preconfigured information.

Embodiment 5: The method of embodiment 3 or 4 wherein the preconfigured information is preconfigured in the SMF.

Embodiment 6: The method of embodiment 3 or 4 wherein the preconfigured information is preconfigured in the UE, and the method further comprises, after the PDU session establishment procedure, receiving (500*b*) the preconfigured information during a PDU session modification procedure.

Embodiment 7: The method of any one of embodiments 3 to 6 wherein the preconfigured information comprises one or more preconfigured QoS profiles and corresponding traffic classes (i.e., a mapping table).

Embodiment 8: The method of any one of embodiments 1 to 7 further comprising sending (504) a bridge capability report to a controller of the TSN.

Embodiment 9: A Session Management Function, SMF, adapted to perform the method of any one of embodiments 1 to 8.

At least some of the following abbreviations may be used in this disclosure. If there is an inconsistency between abbreviations, preference should be given to how it is used above. If listed multiple times below, the first listing should be preferred over any subsequent listing(s).

μs Microsecond
3GPP Third Generation Partnership Project
5G Fifth Generation
5GC Fifth Generation Core
5GS Fifth Generation System
5QI Fifth Generation Quality of Service Indicator
AF Application Function
AMF Access and Mobility Management Function
AN Access Network
ASIC Application Specific Integrated Circuit
AUSF Authentication Server Function
CNC Centralized Network Configuration
CPU Central Processing Unit
CR Change Request
CUC Central User Configuration
DN Data Network
DSP Digital Signal Processor
eNB Enhanced or Evolved Node B
FPGA Field Programmable Gate Array
gNB New Radio Base Station
HSS Home Subscriber Server
ID Identifier
IP Internet Protocol
LTE Long Term Evolution
MME Mobility Management Entity
ms Millisecond
MTC Machine Type Communication
NEF Network Exposure Function
NF Network Function
NG Next Generation
NR New Radio
NRF Network Function Repository Function
NSSF Network Slice Selection Function
PCF Policy Control Function
PDR Packet Detection Rule
PDU Protocol Data Unit
P-GW Packet Data Network Gateway
QFI Quality of Service Flow Identity
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
TR Technical Report
TS Technical Specification
TSN Time Sensitive Network
TT Time Sensitive Network Translator
UDM Unified Data Management
UE User Equipment
UP User Plane
UPF User Plane Function Those skilled in the art will recognize improvements and modifications to the embodiments of the present disclosure. All such improvements and modifications are considered within the scope of the concepts disclosed herein.

REFERENCE LIST 1. 3GPP TR 23.734: "Study on enhancement of 5G System (5GS) for vertical and Local Area Network (LAN) services"
2. 3GPP TS 23.501: "System Architecture for the 5G System; Stage 2".
3. 3GPP TS 23.502: "Procedures of the 5G System; Stage 2".
4. 3GPP TR 23.734: "Study on enhancement of 5G System (5GS) for vertical and Local Area Network (LAN) services"
5. IEEE P802.1Qcc/D1.6: "Draft Standard for Local and metropolitan area networks—Bridges and Bridged Networks—Amendment: Stream Reservation Protocol (SRP) Enhancements and Performance Improvements".
6. IEEE P802.1Qbv/D3.1: "Draft Standard for Local and Metropolitan Area Networks—Bridges and Bridged Networks—Amendment: Enhancements for Scheduled Traffic".

What is claimed is:

1. A method of operation of a Session Management Function, SMF, in a cellular communications system that operates as a bridge for a Time Sensitive Networking, TSN, system, the method comprising:
    obtaining a Quality of Service, QoS, mapping table that maps TSN traffic classes to QoS flows within the cellular communications system, wherein the QoS mapping table is pre-configured during a capability reporting phase in which the cellular communications system reports capabilities of the cellular communications system related to operation as the bridge for the TSN system; and
    distributing at least a part of the QoS mapping table to a User Plane Function, UPF, or a TSN Translator, TT, at the UPF side.

2. The method of claim 1 wherein the at least a part of the QoS mapping table comprises available TSN traffic classes that are associated with a bridge identifier, ID, and a port ID.

3. The method of claim 1 wherein different QoS mapping tables are used for different UPFs.

4. The method of claim 1 wherein the QoS flows comprise one or more pre-established QoS flows.

5. The method of claim 1 wherein the QoS flows comprise one or more QoS flows that are pre-established during the capability reporting phase in which the cellular communications system reports the capabilities of the cellular communications system related to operation as the bridge for the TSN system.

6. The method of claim 1 wherein the QoS flows comprise one or more QoS flows that are pre-established at a time of establishment of one or more Protocol Data Unit, PDU, sessions to the TSN system based on one or more pre-configured QoS profiles.

7. A network node that implements a Session Management Function, SMF, for a cellular communications system that operates as a bridge for a Time Sensitive Networking, TSN, system, the network node comprising:
    a network interface; and
    processing circuitry associated with the network interface, the processing circuitry configured to cause the network node to:
        obtain a Quality of Service, QoS, mapping table that maps TSN traffic classes to QoS flows within the cellular communications system, wherein the QoS mapping table is pre-configured during a capability reporting phase in which the cellular communications system reports capabilities of the cellular communications system related to operation as the bridge for the TSN system; and
        distribute at least a part of the QoS mapping table to a User Plane Function, UPF, or a TSN Translator, TT, at the UPF side.

8. A method of operation of an Application Function, AF, in a cellular communications system that operates as a bridge for a Time Sensitive Networking, TSN, system, the method comprising:
    during a configuration phase of the bridge:
        receiving, from a controller associated with the TSN system, one or more TSN Quality of Service, QoS, requirements and one or more TSN scheduling parameters;
        informing one or more network nodes in the cellular communications system of which QoS flows from among a plurality of pre-configured QoS flows are in use by the TSN system; and
        distributing one or more TSN parameters to relevant network nodes in the cellular communications system, wherein the one or more TSN parameters comprise a Qbv schedule and time sensitive communication assistance information.

9. The method of claim 8 further comprising providing a response to the controller associated with the TSN system.

10. A network node that implements an Application Function, AF, for a cellular communications system that operates as a bridge for a Time Sensitive Networking, TSN, system, the network node comprising:
    a network interface; and
    processing circuitry associated with the network interface, the processing circuitry configured to cause the network node to, during a configuration phase of the bridge:
        receive, from a controller associated with the TSN system, one or more TSN Quality of Service, QoS, requirements and one or more TSN scheduling parameters;
        inform one or more network nodes in the cellular communications system of which QoS flows from among a plurality of pre-configured QoS flows, are in use by the TSN system; and
        distribute one or more TSN parameters to relevant network nodes in the cellular communications system, wherein the one or more TSN parameters comprise a Qbv schedule and time sensitive communication assistance information.

* * * * *